United States Patent
Bennett, Sr.

(10) Patent No.: US 10,247,295 B1
(45) Date of Patent: Apr. 2, 2019

(54) TRANSFER CASE OIL PUMP ASSEMBLY

(71) Applicant: GM GLOBAL TECHNOLOGY OPERATIONS LLC, Detroit, MI (US)

(72) Inventor: Andy Bennett, Sr., Rochester Hills, MI (US)

( * ) Notice: Subject to any disclaimer, the term of this patent is extended or adjusted under 35 U.S.C. 154(b) by 0 days.

(21) Appl. No.: 16/166,779

(22) Filed: Oct. 22, 2018

(51) Int. Cl.
| F16H 57/02 | (2012.01) |
| F04C 2/08 | (2006.01) |
| F16H 57/031 | (2012.01) |
| F01M 1/16 | (2006.01) |
| B60R 17/02 | (2006.01) |

(52) U.S. Cl.
CPC ............ *F16H 57/031* (2013.01); *F01M 1/16* (2013.01); *F04C 2/082* (2013.01); *B60R 17/02* (2013.01)

(58) Field of Classification Search
CPC .. F16H 57/029; F16H 57/031; F16H 57/0409; F16H 57/0441; F16H 57/0483; B60K 17/344; B60K 17/3467; F01M 1/02; F01M 1/16; F01M 1/20; B60R 17/02; F04C 2/082
See application file for complete search history.

(56) References Cited

U.S. PATENT DOCUMENTS

| | | | | |
|---|---|---|---|---|
| 5,085,187 A * | 2/1992 | Black | ...................... | F01M 1/02 123/196 R |
| 5,156,540 A * | 10/1992 | Fernau | .................... | F04C 2/082 418/152 |
| 6,017,202 A * | 1/2000 | Durnack | ................. | F04C 14/04 418/166 |
| 6,174,151 B1 * | 1/2001 | Yarr | ........................ | F01C 1/103 137/469 |
| 6,592,348 B1 * | 7/2003 | Johnson | ................. | F04C 2/082 29/888.023 |
| 8,342,815 B2 * | 1/2013 | Watanabe | ............... | F04C 2/102 417/213 |
| 8,584,553 B2 * | 11/2013 | Campbell | ............ | F16H 57/025 74/606 R |
| 9,624,929 B2 * | 4/2017 | Kim | ........................ | F01C 21/10 |
| 9,803,740 B2 * | 10/2017 | Drill | .................... | B60K 17/344 |
| 2015/0167665 A1 * | 6/2015 | Kumamoto | ........... | F01C 21/108 418/205 |

* cited by examiner

*Primary Examiner* — Adam D Rogers

(57) ABSTRACT

An exemplary assembly includes a housing including a flange extending from a perimeter of the housing, a cover including an edge tab extending from a perimeter of the cover, a gear set positioned between the housing and the cover, an alignment member positioned between the flange and the edge tab, the alignment member adjacent to an exterior surface of the gear set, and a ring at least partially encircling the housing, the ring including an anti-rotation member and a securing tab. The edge tab and the alignment member are enclosed by the anti-rotation member to maintain a radial position of the gear set.

14 Claims, 3 Drawing Sheets

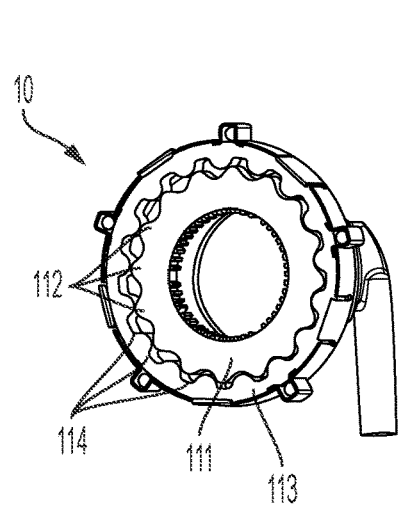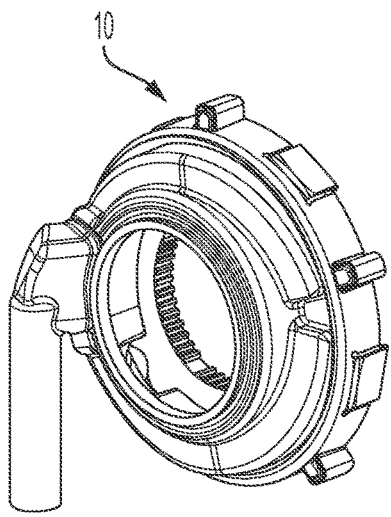
FIG. 2    FIG. 3
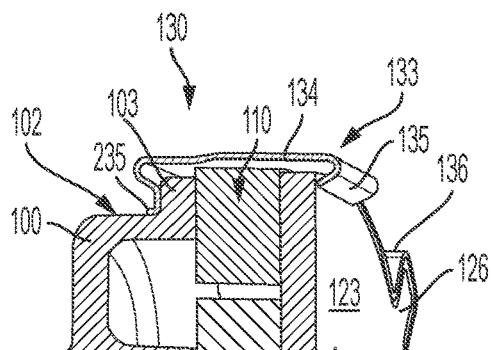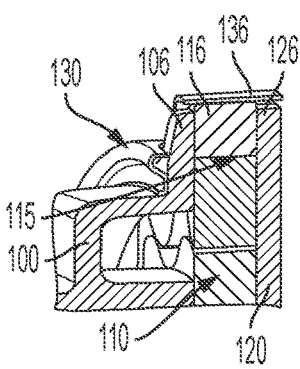
FIG. 4    FIG. 5
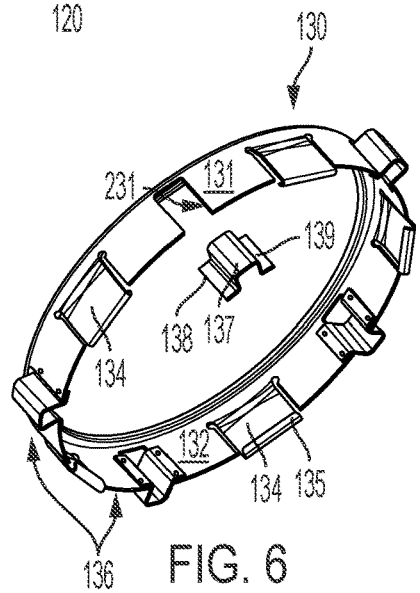
FIG. 6

TRANSFER CASE OIL PUMP ASSEMBLY

INTRODUCTION

The present invention relates generally to the field of vehicles and, more specifically, to an oil pump assembly.

The delivery of power between the front wheels and the rear wheels of a vehicle is typically handled by a transfer case mechanism. The transfer case mechanism typically includes a planetary gear set or set of gears. Lubrication of the planetary gear set is typically provided by a transfer case oil pump.

An improved transfer case oil pump assembly layout reduces defects associated with a die cast process and simplifies assembly of the pump.

SUMMARY

Embodiments according to the present disclosure provide a number of advantages. For example, embodiments according to the present disclosure enable more precise alignment of the transfer case oil pump assembly components using, for example and without limitation, alignment members and locating flanges and tabs.

In one aspect, a transfer case assembly includes a housing including a first tab extending from a perimeter of the housing, a cover including a second tab extending from a perimeter of the cover, a gear set including a first gear and a second gear, the first gear including a first set of gear teeth and the second gear including a first set of gear engagement recesses, the first set of gear teeth configured to engage with the first set of gear engagement recesses, a spacing member positioned between the first tab and the second tab, and a ring at least partially encircling the housing, the ring including an anti-rotation member and a securing tab. The first and second gears are selectively engageable and the first tab, the spacing member, and the second tab are enclosed by the anti-rotation member.

In some aspects, the cover includes a first cover surface and a second cover surface opposite the first cover surface and the first cover surface is adjacent to the gear set, and the securing tab includes a tab body and a retention member and the retention member interfaces with the second cover surface.

In some aspects, the second gear includes an edge surface defining a perimeter of the gear set and the spacing member is positioned between the edge surface and the anti-rotation member.

In some aspects, the ring includes a notch and the anti-rotation member includes a channel having a first flange and a second flange opposite the second flange, the anti-rotation member engages with the notch such that the channel extends from an outer surface of the ring and the first flange and the second flange interface with an interior surface of the ring.

In some aspects, the channel of the anti-rotation member encloses the first tab of the housing, the spacing member, and the second tab of the cover to radially position the gear set within the housing.

In some aspects, the securing tab is flexibly coupled to the ring.

In another aspect, an assembly includes a housing including a flange extending from a perimeter of the housing, a cover including an edge tab extending from a perimeter of the cover, a gear set positioned between the housing and the cover, an alignment member positioned between the flange and the edge tab, the alignment member adjacent to an exterior surface of the gear set, and a ring at least partially encircling the housing, the ring including an anti-rotation member and a securing tab. The edge tab and the alignment member are enclosed by the anti-rotation member to maintain a radial position of the gear set.

In some aspects, the cover includes a first cover surface and a second cover surface opposite the first cover surface and separated from the first cover surface by an edge surface, the edge tab extends from the edge surface, and the edge tab and the alignment member are aligned such that the alignment member defines a spacing between the cover and the housing.

In some aspects, the ring includes a notch and the anti-rotation member includes a channel having a first flange and a second flange opposite the second flange, the anti-rotation member engages with the notch such that the channel extends from an outer surface of the ring and the first flange and the second flange interface with an interior surface of the ring.

In some aspects, the channel of the anti-rotation member encloses the flange of the housing, the alignment member, and the edge tab of the cover to radially position the gear set within the housing.

In some aspects, the securing tab is flexibly coupled to the ring.

In some aspects, the ring further includes a positioning member that interfaces with the cover to position the ring relative to the cover.

In some aspects, the securing tab includes a tab body and a retention member integrally formed with the tab body, the retention member interfacing with the flange of the housing.

In some aspects, the retention member applies a first retention force to the flange of the housing and the positioning member applies a second retention force to the cover to position the gear set between the housing and the cover.

BRIEF DESCRIPTION OF THE DRAWINGS

The present disclosure will be described in conjunction with the following figures, wherein like numerals denote like elements.

FIG. 2 is a perspective view of a first end of the transfer case assembly of FIG. 1, according to an embodiment.

FIG. 3 is a perspective view of a second end of the transfer case assembly of FIG. 1, according to an embodiment.

FIG. 4 is a partial cutaway view of the transfer case assembly of FIG. 1, according to an embodiment.

FIG. 5 is a second partial cutaway view of the transfer case assembly of FIG. 1, according to an embodiment.

FIG. 6 is a perspective view of a ring of the transfer case assembly of FIG. 1, according to an embodiment.

Figure 1:
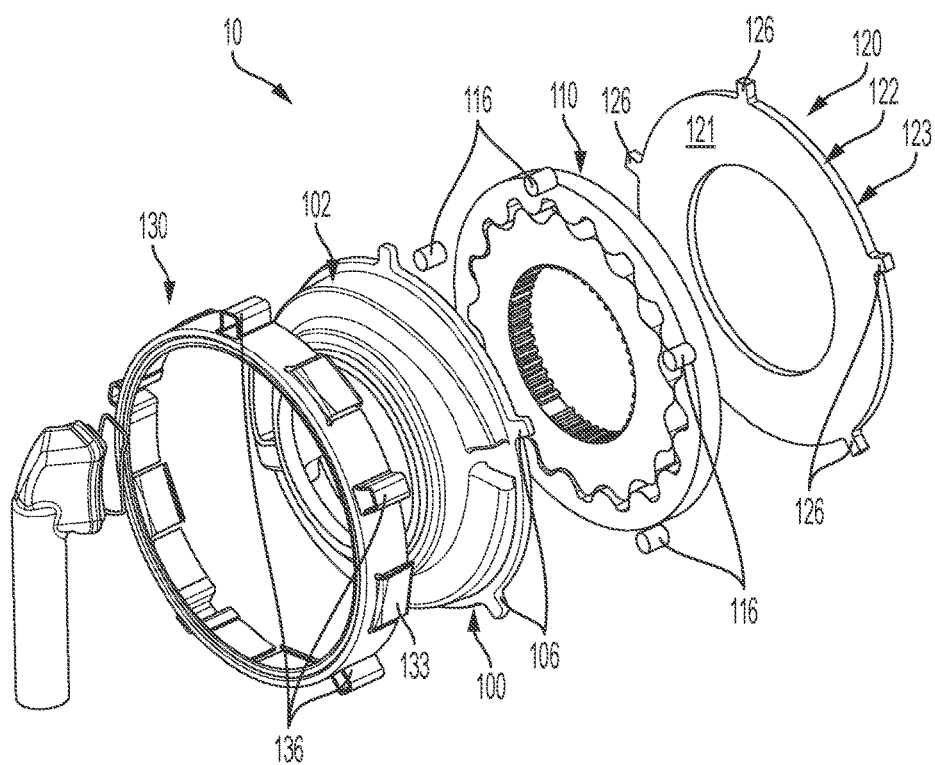
FIG. 1 is a perspective, exploded view of a transfer case assembly, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

A transfer case oil pump assembly, according to an embodiment, provides improved alignment of the transfer case oil pump assembly components using, for example and without limitation, one or more alignment members. Furthermore, the embodiments disclosed herein also facilitate improved assembly and spacing of a gear set with a housing.

In one embodiment, as shown in FIGS. 1-3, a transfer case assembly 10 includes a housing 100. The housing 100 includes an outer surface 102 and an inner surface (not shown). In some embodiments, the housing 100 includes a flange 103. The flange 103 defines a perimeter of the housing 100. The flange 103 further defines an interface surface for retention of a ring, as discussed in greater detail herein. The housing 100 includes at least one first tab 106 extending from the perimeter of the housing 100. In some embodiments, the tab 106 is an extension of the flange 103. FIGS. 1-3 illustrate a housing 100 having five (5) first tabs 106. However, in other embodiments, the housing 100 includes one, two, three, four, six, seven, eight or more first tabs 106. In some embodiments, the first tabs 106 are equally distributed around the perimeter of the housing 100. In some embodiments, the first tabs 106 are not equally distributed around the perimeter of the housing 100, such that a single orientation of the housing 100 relative to the other components of the assembly 10 is permitted, thus improving accurate assembly of the assembly 10.

The housing 100 is contoured to enclose a gear set 110. The gear set 110 includes a first gear 111 and a second gear 113. In some embodiments, the first gear 111 is interior to the second gear 113. The first gear 111 includes a first set of gear teeth 112 and the second gear 113 includes a first set of gear engagement recesses 114. The first set of gear teeth 112 are configured to engage with the first set of gear engagement recesses 114. The first and second gears 111, 113 are selectively engageable from input received from an input shaft (not shown) and transferred to the first gear 111 via a set of input gear teeth. The second gear 113 includes an edge surface 115 (shown in FIG. 6).

With continued reference to FIG. 1, the transfer case assembly 10 further includes a cover 120. The cover 120 has a first surface 121 and a second surface 123 opposite the first surface 121 and separated from the first surface 121 by an edge surface 122. The first surface 121 is adjacent to the gear set 110. The cover 120 includes at least one second tab 126 extending from the edge surface 122 of the cover 120. FIGS. 1-3 illustrate a cover 120 having five (5) second tabs 126. However, in other embodiments, the cover 120 includes one, two, three, four, six, seven, eight or more second tabs 126. In some embodiments, the second tabs 126 are equally distributed around the perimeter of the cover 120. In some embodiments, the second tabs 126 are not equally distributed around the perimeter of the cover 120, such that a single orientation of the cover 120 relative to the other components of the assembly 10 is permitted, thus improving accurate assembly of the assembly 10. The position of the second tabs 126 around the perimeter of the cover 120 is aligned with the position of the first tabs 106 around the perimeter of the housing 100.

As best shown in FIGS. 1 and 5, a spacing member 116 is positioned between the first tab 106 of the housing 100 and the second tab 126 of the cover 120. FIGS. 1 and 2 illustrate a transfer case assembly 100 including five (5) spacing members 116. However, in other embodiments, the number of spacing members 116 corresponds to the number of first tabs 106 and second tabs 126.

The first tab 106, the spacing member 116, and the second tab 126 are aligned such that the spacing member 116 provides a predefined spacing between the cover 120 and the housing 100. In some embodiments, the spacing member 116 is an approximately cylindrical member having a length corresponding to a width of the gear set 110 such that the gear set 110 is spaced between the housing 100 and the cover 120 to allow the first and second gears 111, 113 to freely rotate without mashing or constriction.

In some embodiments, as shown in FIGS. 1-5, a ring 130 at least partially encircles the housing 100. With more specific reference to FIG. 6, the ring 130 has a first or outer surface 131 and a second or inner surface 132. The ring 130 also includes an edge surface 231. The edge surface 231 defines a plurality of notches or openings in the ring 130. The openings in the ring 130 open towards the cover 120 such that the ring 130 fits securely around the housing 100. With reference to FIG. 6, the ring 130 further includes a positioning member 235. The positioning member 235 extends from a first end of the ring 130. The positioning member 235 is, in some embodiments, a flange or lip that interfaces with the flange 103 of the housing 100 and radially locates the ring 130 on the housing 100.

In some embodiments, the ring 130 includes at least one securing tab 133 and at least one anti-rotation member 136. The embodiment shown in FIGS. 1-6 includes five (5) securing tabs 133 and five (5) anti-rotation members 136. However, in other embodiments, the ring 130 includes more or fewer securing tabs 133 and anti-rotation members 136. In some embodiments, the number of securing tabs 133 is different from the number of anti-rotation members 136. In some embodiments, the securing tabs 133 and/or the anti-rotation members 136 are equally distributed around a circumference of the ring 130.

In some embodiments, the securing tab 133 includes a tab body 134 and a retention member 135. The tab body 134 has a first end and a second end opposite the first end. The first end of the tab body 134 is flexibly coupled to the ring 130. With reference to FIG. 4, the tab body 134 encircles the edges of the housing 100, the gear set 110, and the cover 120.

The retention member 135 extends from the second end of the tab body 134. In some embodiments, the retention member 135 is integrally formed with the tab body 134 and forms a C-shaped curve at the second end of the tab body 134. The retention member 135 curves inward toward the second surface 132 of the ring 130 such that the retention member 135 interfaces with the second surface 123 of the cover 120, as shown in FIG. 4. The retention member 135 applies a first retention force to the second surface 123 of the cover 120 and the positioning member 235 applies a second retention force to the flange 103 of the housing 100. The first and second retention forces apply pressure to the housing 100 and the cover 120 to secure the gear set 110 therebetween.

With reference to FIGS. 3 and 6, the anti-rotation member 136 includes a U-shaped channel 137. A first side of the channel 137 includes a first flange 138 and a second and opposite side of the channel 137 includes a second flange 139. The first flange 138 and the second flange 139 interface with the second or inner surface 132 of the ring 130 such that the channel 137 extends radially outward of the first or outer surface 131 of the ring 130. In some embodiments, the anti-rotation member 136 is secured to the ring 130 via mechanical or chemical means, such as, for example and without limitation, fasteners or spot welding. In some embodiments, the first and second flanges 138, 139 are spot welded to the inner surface 132 of the ring. In some embodiments, the anti-rotation member 136 is integrally formed with the ring 130.

In some embodiments, the edge surface 231 defines a plurality of notches or openings in the ring 130. The anti-rotation member 136 engages with the notch such that the channel 137 extends from the outer surface 131 of the ring 130 and the first flange 138 and the second flange 139 interface with the inner surface 132 of the ring 130 as discussed herein.

With reference to FIG. 5, the anti-rotation member 136 encloses the first tab 106 of the housing 100 and the second tab 126 of the cover 120. The spacing member 116 is sandwiched between the first tab 106 and the second tab 126. The spacing member 116 is also enclosed by the anti-rotation member 136 and is positioned between the edge surface 115 of the gear set 110 and the anti-rotation member 136 to radially position the gear set 110 within the housing 100.

Figure 7:
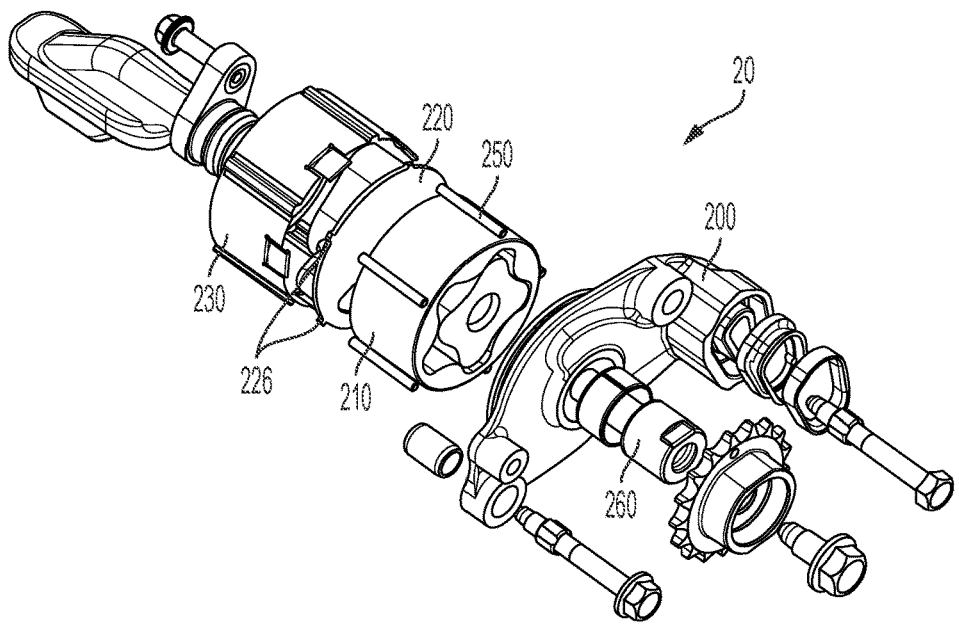
FIG. 7 is a perspective, exploded view of a transfer case pump assembly, according to another embodiment.
Figure 8:
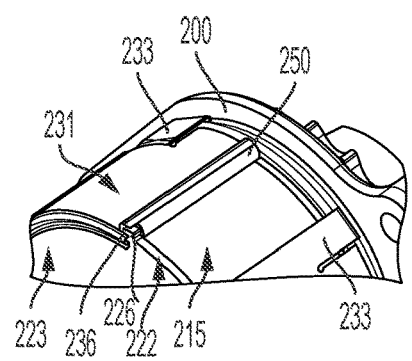
FIG. 8 is a partial perspective view of the transfer case pump assembly of FIG. 7, according to an embodiment.
Figure 9:
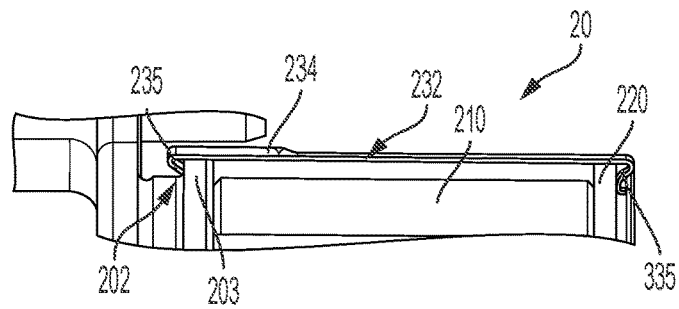
FIG. 9 is a partial cutaway view of the transfer case pump assembly of FIG. 7, according to an embodiment.

FIGS. 7-9 illustrate another embodiment of a pump assembly 20. In some embodiments, the pump assembly 20 is used as a scavenge pump for a dry sump oil system. Because the scavenge pump of a dry sump oil system does not provide significant oil pressure, the embodiment of the pump assembly 20 discussed herein provides sufficient sealing with minimal oil leakage.

The pump assembly 20 includes a housing 200. The housing 200 includes an outer surface 202 and an inner surface (not shown). In some embodiments, the housing 200 includes a flange 203. The flange 203 defines a perimeter of the housing 200. The flange 203 further defines an interface surface for locating and retaining a ring, as discussed in greater detail herein.

The pump assembly 20 also includes a gear set 210. The gear set 210 has an exterior or outer surface 215. A plurality of alignment members 250 are coupled to the exterior or outer surface 215. In some embodiments, the alignment members 250 are coupled to the exterior surface 215 via welding or other chemical means. In some embodiments, the alignment members 250 are generally cylindrical pins. FIGS. 7-9 illustrate a gear set 210 having five (5) alignment members 250. However, in other embodiments, the gear set 210 includes one, two, three, four, six, seven, either or more alignment members 250. In some embodiments, the alignment members 250 are equally distributed around the perimeter of the gear set 210. In some embodiments, the alignment members 250 are not equally distributed around the perimeter of the gear set 210 such that a single orientation of the gear set 210 relative to the other components of the assembly 20 is permitted, thus improving accurate assembly of the assembly 20.

The gear set 210 abuts against a cover 220. The cover 220 has a first surface (not shown) and a second surface 223 opposite the first surface and separated from the first surface by an edge surface 222. The first surface is adjacent to the gear set 210. The cover 220 includes at least one edge tab 226 extending from the edge surface 222 of the cover 220. FIGS. 7-9 illustrate a cover 220 having five (5) edge tabs 226. However, in other embodiments, the cover 220 includes one, two, three, four, six, seven, eight or more edge tabs 226. In some embodiments, the edge tabs 226 are equally distributed around the perimeter of the cover 220. In some embodiments, the edge tabs 226 are not equally distributed around the perimeter of the cover 220 such that a single orientation of the cover 220 relative to the other components of the assembly 20 is permitted, thus improving accurate assembly of the assembly 20.

The edge tab 226 and the alignment member 250 are preferably aligned such that the alignment member 250 provides a predefined spacing between the cover 220 and the housing 200. In some embodiments, the alignment pin is an approximately cylindrical member having a length corresponding to a width of the gear set 210 such that the gear set 210 is spaced between the housing 200 and the cover 220 to allow the gear set 210 to freely rotate without mashing or constriction.

In some embodiments, as shown in FIGS. 7-9, a ring 230 at least partially encircles the housing 200. Similar to the ring 130 discussed herein with reference to FIG. 6, the ring 230 has a first or outer surface 231 and a second or inner surface 232. The ring 230 also includes an edge surface that defines a plurality of notches or openings in the ring 230. The openings in the ring 230 open towards the cover 220 such that the ring 230 fits securely around the housing 200. With reference to FIG. 9, the ring 230 further includes a positioning member 335. The positioning member 235 extends from a first end of the ring 230. The positioning member 335 is, in some embodiments, a flange that interfaces with the cover 220 and locks or retains the ring 230 relative to the cover 220.

With continued reference to FIGS. 7-9, in some embodiments, the ring 230 includes at least one securing tab 233 and at least one anti-rotation member 236. The embodiment shown in FIGS. 7-9 includes five (5) securing tabs 233 and five (5) anti-rotation members 236. However, in other embodiments, the ring 230 includes more or fewer securing tabs 233 and anti-rotation members 236. In some embodiments, the number of securing tabs 233 is different from the number of anti-rotation members 236. In some embodiments, the securing tabs 233 and/or the anti-rotation members 236 are equally distributed around a circumference of the ring 230.

In some embodiments, the securing tab 233 includes a tab body 234 and a retention member 235. The tab body 234 has a first end and a second end opposite the first end. The first end of the tab body 234 is flexibly coupled to the ring 230.

The retention member 235 extends from the second end of the tab body 234. In some embodiments, the retention member 235 is integrally formed with the tab body 234 and forms a C-shaped curve at the second end of the tab body 234. The retention member 235 curves inward toward the second or interior surface 232 of the ring 230 such that the retention member 235 interfaces with the flange 203 of the housing 200, as shown in FIG. 9. The retention member 235 applies a first retention force to the flange 203 of the housing 200 and the positioning member 335 applies a second retention force to the cover 220. The first and second retention forces apply pressure to the housing 200 and the cover 220 to secure the gear set 210 therebetween.

Similar to the anti-rotation member 136 discussed herein with reference to FIGS. 3 and 6, the anti-rotation member 236 includes a U-shaped channel. A first side of the channel includes a first flange and a second and opposite side of the channel includes a second flange. The first flange and the second flange interface with the second or inner surface 232 of the ring 230 such that the channel extends radially outward of the first or outer surface 231 of the ring 230. In some embodiments, the anti-rotation member 236 is secured to the ring 230 via mechanical or chemical means, such as, for example and without limitation, fasteners or spot welding. In some embodiments, the first and second flanges are spot welded to the inner surface 232 of the ring 230. In some embodiments, the anti-rotation member 236 is integrally formed with the ring 230.

In some embodiments, an edge surface defines a plurality of notches or openings in the ring 230. The anti-rotation member 236 engages with the notch such that the channel extends from the outer surface 231 of the ring 230 and the first flange and the second flange interface with the inner surface 232 of the ring 230 as discussed herein.

With reference to FIG. 8, the anti-rotation member 236 encloses the edge tab 226 of the cover 120. The alignment member 216 is sandwiched between the flange 203 of the housing 200 and the edge tab 226. The alignment member 216 is also enclosed by the anti-rotation member 236 and is positioned between the edge surface 215 of the gear set 210 and the anti-rotation member 236 to radially position the gear set 210 within the housing 200.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transfer case assembly, comprising:
    a housing including a first tab extending from a perimeter of the housing;
    a cover including a second tab extending from a perimeter of the cover;
    a gear set including a first gear and a second gear, the first gear including a first set of gear teeth and the second gear including a first set of gear engagement recesses, the first set of gear teeth configured to engage with the first set of gear engagement recesses;
    a spacing member positioned between the first tab and the second tab; and
    a ring at least partially encircling the housing, the ring including an anti-rotation member and a securing tab;
    wherein the first and second gears are selectively engageable and the first tab, the spacing member, and the second tab are enclosed by the anti-rotation member.

2. The transfer case assembly of claim 1, wherein the cover includes a first cover surface and a second cover surface opposite the first cover surface and the first cover surface is adjacent to the gear set, and the securing tab includes a tab body and a retention member and the retention member interfaces with the second cover surface.

3. The transfer case assembly of claim 1, wherein the second gear includes an edge surface defining a perimeter of the gear set and the spacing member is positioned between the edge surface and the anti-rotation member.

4. The transfer case assembly of claim 1, wherein the ring includes a notch and the anti-rotation member includes a channel having a first flange and a second flange opposite the second flange, the anti-rotation member engages with the notch such that the channel extends from an outer surface of the ring and the first flange and the second flange interface with an interior surface of the ring.

5. The transfer case assembly of claim 4, wherein the channel of the anti-rotation member encloses the first tab of the housing, the spacing member, and the second tab of the cover to radially position the gear set within the housing.

6. The transfer case assembly of claim 1, wherein the securing tab is flexibly coupled to the ring.

7. An assembly, comprising:
    a housing including a flange extending from a perimeter of the housing;
    a cover including an edge tab extending from a perimeter of the cover;
    a gear set positioned between the housing and the cover;
    an alignment member positioned between the flange and the edge tab, the alignment member adjacent to an exterior surface of the gear set; and
    a ring at least partially encircling the housing, the ring including an anti-rotation member and a securing tab;
    wherein the edge tab and the alignment member are enclosed by the anti-rotation member to maintain a radial position of the gear set.

8. The assembly of claim 7, wherein the cover includes a first cover surface and a second cover surface opposite the first cover surface and separated from the first cover surface by an edge surface, the edge tab extends from the edge surface, and the edge tab and the alignment member are aligned such that the alignment member defines a spacing between the cover and the housing.

9. The assembly of claim 7, wherein the ring includes a notch and the anti-rotation member includes a channel having a first flange and a second flange opposite the second flange, the anti-rotation member engages with the notch such that the channel extends from an outer surface of the ring and the first flange and the second flange interface with an interior surface of the ring.

10. The assembly of claim 9, wherein the channel of the anti-rotation member encloses the flange of the housing, the alignment member, and the edge tab of the cover to radially position the gear set within the housing.

11. The assembly of claim 7, wherein the securing tab is flexibly coupled to the ring.

12. The assembly of claim 7, wherein the ring further includes a positioning member that interfaces with the cover to position the ring relative to the cover.

13. The assembly of claim 12, wherein the securing tab includes a tab body and a retention member integrally formed with the tab body, the retention member interfacing with the flange of the housing.

14. The assembly of claim 13, wherein the retention member applies a first retention force to the flange of the housing and the positioning member applies a second retention force to the cover to position the gear set between the housing and the cover.

* * * * *